Patented Feb. 4, 1941

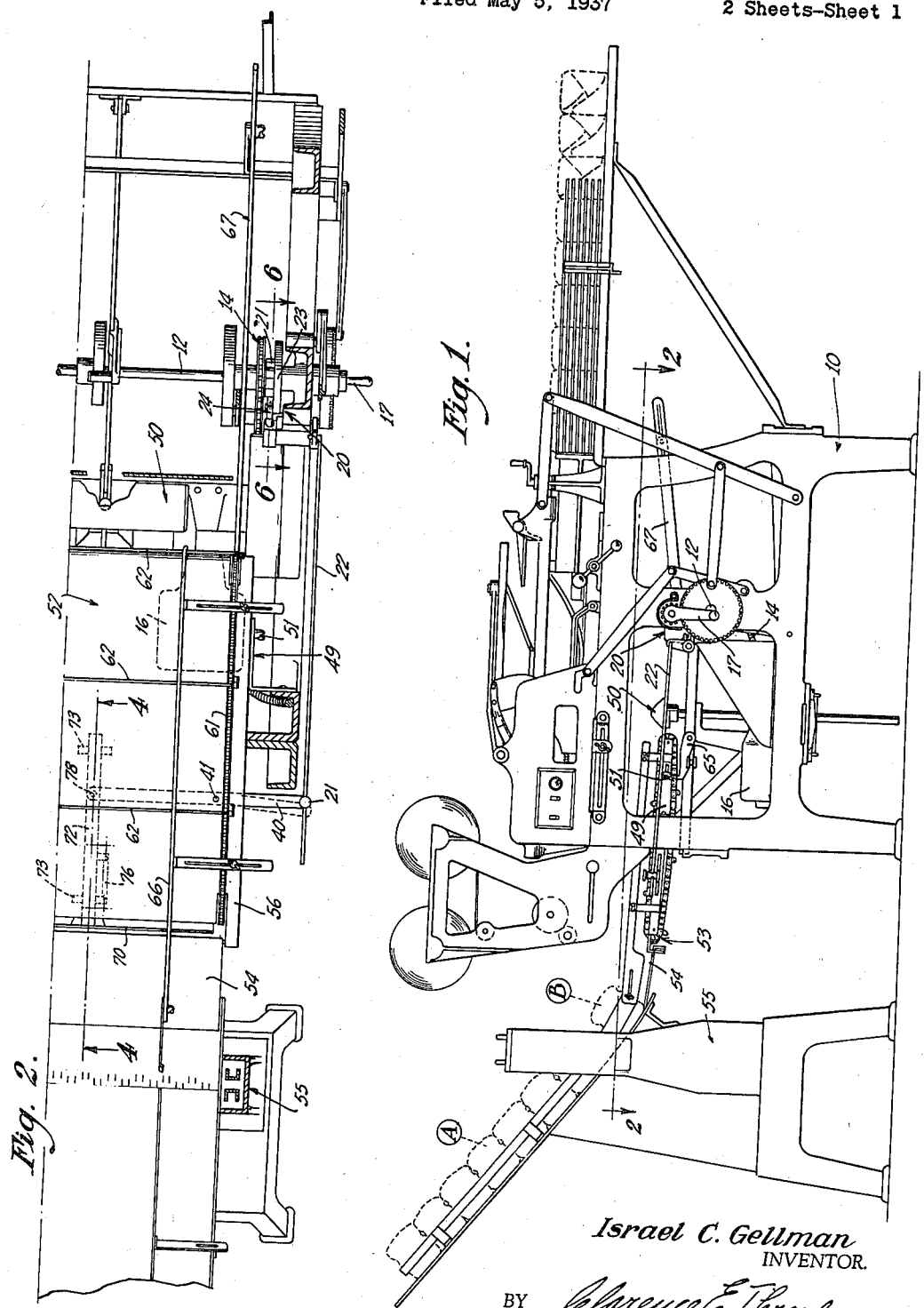

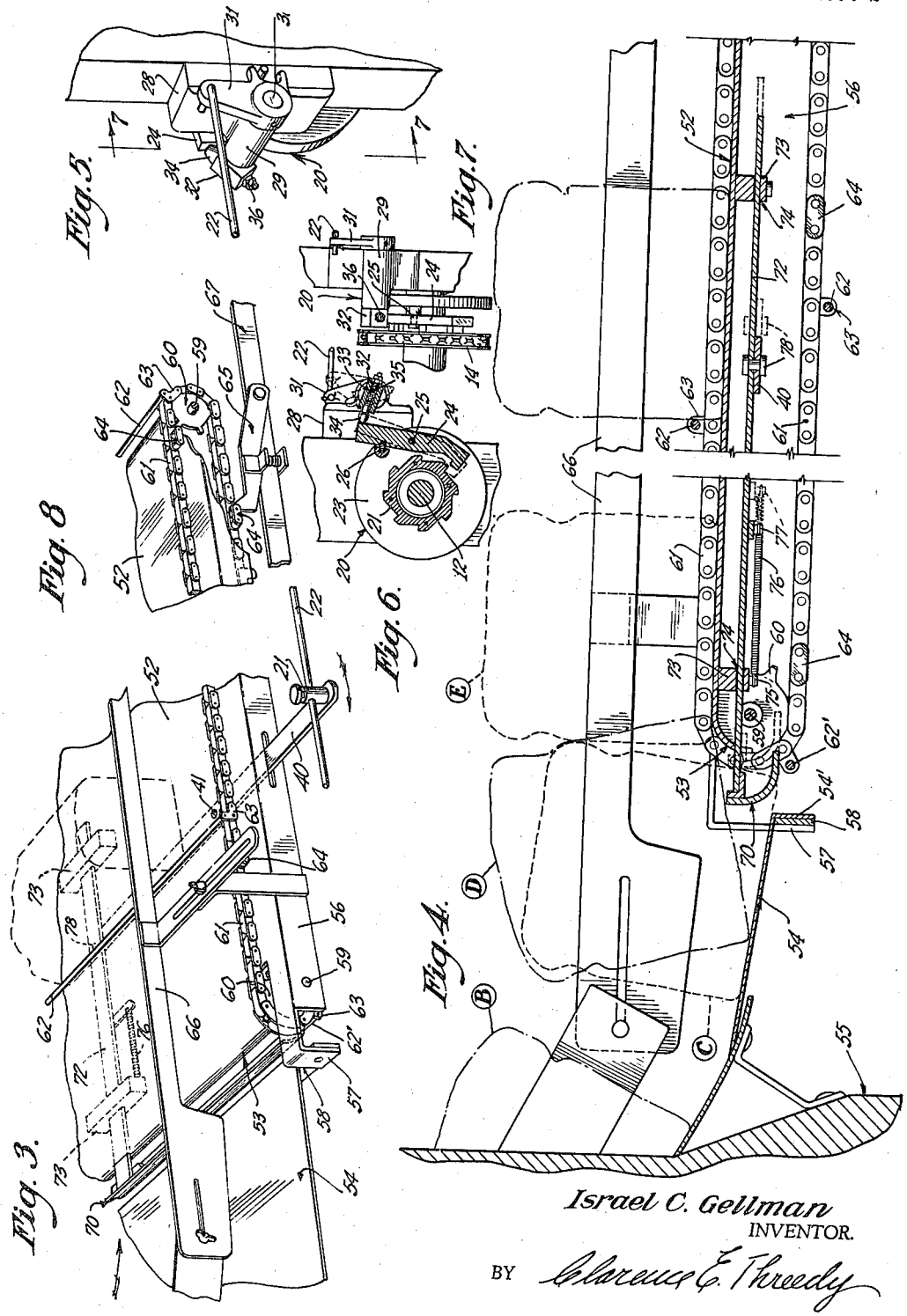

2,230,797

UNITED STATES PATENT OFFICE 2,230,797

BREAD WRAPPING MACHINE

Israel C. Gellman, Rock Island, Ill., assignor to Gellman Manufacturing Co., Rock Island, Ill., a corporation of Illinois Application May 5, 1937, Serial No. 140,980

5 Claims. (Cl. 198—21)

This invention pertains to bread wrapping machinery and automatic control mechanism for a wrapping machine adapted to wrap sliced bread.

Among its important objects of the present invention are the provision of a wrapping machine having a central drive mechanism controlled by a single clutch, and a step by step conveyor adapted to receive sliced bread from an automatic slicing machine, which cooperates with the wrapper to feed sliced bread in loaf form to the conveyor so that the latter may feed loaves to the wrapper in timed movements.

A further object is the provision of a device of the character described in which the clutch for the main or central power drive of the wrapping machine is controlled by the movement of bread from the slicing machine to the conveyor.

A more specific object is the provision of a circuitously movable conveyor having spaced bread moving or conveying members which pass over and around a platform, one end of which normally confronts the discharge shelf of a slicing machine from which the sliced bread is moved in loaf form to abut the outer end of the conveyor platform, one of the aforesaid conveying members passing from under the platform in a direction around the outer end of the same and engaging the bottom of the abutting loaf so as to tilt the same partly onto the platform, the following loaves advancing from the slicer thereafter pushing the tilted loaf entirely onto the platform for further movement thereon by one of the conveying members.

A further and specifically stated object is the provision of automatic control mechanism including a clutch control bar at the outer end of the conveyor platform and against which advancing loaves may bear to hold the clutch in effective condition to operate the wrapping machine, the latter continuing to run so long as there are at least two loaves at the end of the platform, one of the same being picked up and conveyed to the wrapping mechanism, while the last loaf is tilted partly onto the end of the platform and out of operative engagement with the clutch control, so that the wrapping machine will stop with one loaf in position to be pushed completely onto the conveyor as soon as another loaf again advances from the slicer.

Yet another object is the provision of improved timing drive mechanism for the moving conveyor members.

The foregoing and other objects and novel aspects of the invention will more fully appear as the following specification develops in view of the annexed drawings, in which:

Fig. 1 is a side elevation of an automatic wrapping machine and a cooperating slicing machine;

Fig. 2 is a horizontal section partly in plan and taken along lines 2—2 of Fig. 1;

Fig. 3 is an enlarged perspective of the conveyor mechanism and automatic clutch control;

Fig. 4 is an enlarged side elevation of part of the conveyor mechanism;

Fig. 5 is a perspective fragment showing part of the clutch mechanism;

Fig. 6 is a side elevational detail of part of the clutch, and is taken along line 6—6 of Fig. 2;

Fig. 7 is a front elevational detail of the clutch taken along lines 7—7 of Fig. 5; while Fig. 8 is a complementary perspective fragment of the conveyor structure seen in Fig. 3, and shows the conveyor drive.

The invention herein disclosed is in part a continuation of my co-pending application, Serial No. 129,561, to which attention is called for a more detailed description of the wrapping machine hereafter referred to, excepting the particular improvements defined by the claims appended hereto, and fully described herein. Attention is also called to my United States Patent No. 1,951,605 for improvements in Automatic control mechanism in bread handling machinery.

Referring to Figs. 1 and 2, the bread wrapping machine 10 includes a central drive shaft 12, a power-driven sprocket 14 continuously rotated by a motor 16, and manually rotatable by a crank 17. The master control mechanism, which is the subject of the present invention, includes a generally indicated clutch 20 (Figs. 2 and 7) and a clutch rod 22, automatically (or manually) operable as set forth hereafter.

As an essential element of the wrapping mechanism itself, there is a vertically reciprocable loaf elevator 50 driven intermittently through a connection with the central drive shaft 12, and in its lowermost position, as seen in Figs. 1 and 2, this elevator is on a level with the inward end of a conveyor platform 52 from which sliced bread in loaf form passes onto the elevator to be raised and be carried through a series of wrapping operations not important to detail here.

As shown in Figs. 3, 4 and 8, the conveyor includes a platform 52 having an inner end positioned opposite the elevator 50, as aforesaid, and having an outer, downwardly curved, end 53 extended beyond the main body of the wrapping machine itself at a level substantially to confront the end of a downwardly inclined discharge shelf or apron 54 extended from a slicing machine 55 in such a manner as to block the descending or discharge movement of sliced loaves (such as loaf C in dotted lines, Fig. 4).

The conveyor structure includes a pair of spaced longitudinal side rails 56 having their outer ends 57 turned down to support an end cross rail 58 adapted to support the hooked outer end 54' of apron 54. These side rails 56 are adjustably attached to the main frame of the wrapping machine 10 by means of brackets 49 (Fig. 2) and wing nuts 51, the bolts for which extend through elongated slots in the side rails, so that the latter conveyor platform and assembly can be shifted longitudinally relative to the machine frame 10. At their respective ends, the side rails 56 provide a bearing support for lateral sprocket shafts 59, each provided with a pair of sprockets 60, and adjacent each side rail 56.

Along each longitudinal side of the conveyor platform 52, sprocket chains 61 are trained over sprocket gears 60 between opposite ends of the platform, and at spaced intervals, conveyor cross rods 62 extend laterally across the platform between opposite sprocket chains 61, being attached to the latter by means of special link elements having a lateral lug or extension 63 apertured to receive an end of the cross rod.

The sprocket chain 61 is additionally provided at regular intervals along its extent with sidewise extending pawl-engaging links 64 (Fig. 8), hereinafter called "pawl links," the function of which will later be described in detail, it being sufficient at present to state that links 64 are engaged by a driving pawl 65 which advances chain 61 in steps, and causes the cross rods 62 to pass successively over and around platform 52 to move sliced bread from the outer end 53 thereover and between spaced guide rails 66 to the inner end of the platform and to elevator 50.

Pawl 65 moves back and forth with a reciprocable drive arm 67, driven intermittently in timed relation to the movement of elevator 50 by means connected with the central drive shaft 12 and under control of the clutch 20.

The clutch mechanism 20, as shown in Figs. 5, 6 and 7, includes a continuously rotating sprocket gear 14 on shaft 12 driven by motor 16, and a continuously rotating ratchet gear 21 on shaft 12. Closely adjacent the ratchet gear is a clutch plate 23 normally floating on the central drive shaft 12 and adapted to be clutched or keyed with the ratchet 21 by the means now to be described. A clutch pawl 24 is pivoted, as at 25, on disc 23 and is normally urged into clutching engagement with ratchet 21 by a spring 26, and in this condition the clutch plate or disc 23 is latched to the ratchet gear 21 and rotates with the same, thus driving shaft 12.

Conveniently disposed on the frame of the machine 10 is a block 28 provided with a sleeve boss 29 through which extends a stud shaft 30 on one outer end of which is secured a lever arm 31 to the outer end of which is attached a hook end of the operating rod 22. The opposite or inner end of the shaft 30 has secured thereon for rotation therewith a block 32 (Figs. 5 and 6) and movable laterally of the block and stud shaft 30 is a pin 33 having a rounded head 34 engageable with the free end of the clutch pawl 24 and having a buffer spring 35 seated within the block and embracing the pin to urge the latter toward the pawl, there being an adjustment screw 36 provided at the outer end of the pin 33 exteriorly of the block 32 by means of which the tension of the spring 35 may be regulated. Thus when the operating rod 22 is moved back and forth by the automatic control mechanism elsewhere described the lever arm 31 will transmit this motion to the stud shaft 30 and cause the block 32 and the rounded head 34 of the pin 33 to bear against the free end of the pawl 24 and urge the latter against the tension of the spring 26 out of clutching engagement with the ratchet 21, the headed pin 33 in block 32 being effective to hold the pawl in this condition, thus stopping rotation of the central drive shaft 12.

The opposite end of the clutch control rod is adjustably attached by a screw stud 21 (Fig. 3) to a link cross arm 40 pivoted as at 41 to the under side of conveyor platform 52, thus completing the actuating linkage between the clutch operating arm 31 and control or presser bar 70.

Automatic control of the clutch 20 by movement of bread from the slicer is effected by means of an elongated laterally curved presser bar 70 which extends parallel to, and somewhat spaced from, the outer end 53 of platform 52. At about its mid point, the presser bar is attached to a slide bar 72 which is supported for sliding movement longitudinally of the platform 52 by a pair of spaced blocks 73 having aligned bar receiving slots 74. Anchored at 75 to the outermost one of these blocks (Fig. 4) is a spring 76 attached at its outer end 77 to the slide bar 72 so as normally to urge the latter outwardly, thus positioning the presser bar 70 away from the platform end 53.

By means of a pivotal connection 78 (Fig. 4) between the inner end of link arm 40 and slide arm 72, the back and forth movement of the latter is communicated to the clutch rod 22, and when the presser bar 70 is disposed outwardly or away from the end 53 of platform 52, the clutch mechanism 20 disconnects the central drive shaft 12 from the driving means, and when presser bar 70 is moved in (to the right, Figs. 3 and 4), the clutch is operated and the wrapping mechanism, including conveyor bars 62, is set in motion.

*Operation*

Assuming the slicing machine 55 of Fig. 1 to be charged with unsliced loaves A, the latter will descend through the slicing means thereof (preferably vertically and oppositely reciprocating knives) to be sliced and passed still in loaf form toward the discharge apron 54 (position B), and succeeding loaves will urge the sliced loaf B toward and against the presser bar 70 into dotted line position C, and continued pressure (relatively slight) from behind, due to the advance of sliced loaves, will cause the loaf in position C to press the bar 70 in (to the right, Fig. 4) and shift the clutch rod 22 and hence the clutch arm 31 so as to release the pawl 24, whereupon ratchet 21 and clutch plate 23, on the central drive shaft 12, will rotate in unison and the wrapping machine will be set in motion.

As a result of rotation of shaft 12, the elevator 50 will move regularly up and down, and the drive arm 67 will be reciprocated in timed relation to this movement of the elevator so that the drive pawl 65 will move first in one (left) direction to engage one of the special pawl links 64, and thus move the sprocket chain 61 a predetermined amount around gears 60. Thereafter the pawl will return to its first position (back to the right) and engage another pawl link, and again advance the chain 61. In this manner chain 61 will be moved (right to left, Fig. 4) in a direction around the platform 52, and cross rods 62 will likewise pass over and around the platform, until one of the rods, especially designated 62', will move up under the loaf C and tilt the latter into position D, and thereafter the tilted loaf will be pushed by following loaves onto the platform where it will be picked up by one of the following cross rods 62 and moved along into position E, and so on, until the loaf moves onto the elevator.

When the supply from the slicer is exhausted or interrupted for any reason, the last loaf C will be tilted into position D, whereupon presser bar 70 will move out under the urgence of spring 76 and the clutch 20 will disconnect the central drive shaft 12 from the motor drive.

It will be observed that when loaves from the slicer again arrive behind the last loaf (at D), the operation of the machine will immediately be resumed, since the newly advancing loaves will push the waiting loaf onto the platform, and the first of the new loaves to arrive (having pushed the waiting loaf as aforesaid) will bear against presser bar 70 and again throw the clutch in.

Various adjustments for different operating conditions are generally contemplated in the wrapping mechanism, and are set forth in my co-pending application above identified. However, I include in the present case a novel arrangement for assuring that the relative movement of the chain 61 and driving pawl 65 shall always be the same, regardless of the adjusted position of the conveyor assembly, and platform relative to the main frame of the wrapper. This is of importance for a number of reasons; first, because it is frequently necessary to shift the conveyor platform on its supporting brackets 49 to accommodate loaves of different widths to assure proper pick-up from the slicer and proper deposit on the elevator. In addition, the machine may be manually driven by means of the crank 17, and it is an advantage to have the pawl 65 "take hold" at only one point on the chain during each reciprocation.

Since the specific embodiment described herein by way of illustration may be varied and rearranged in various details without departing from the broad scope of the invention, all manner of equivalent change, modification and variation is intended to be included within the scope of the appended claims.

Having thus described my invention, what I claim as new and desire to protect by Letters Patent is:

1. In a bread wrapping machine having a conveyor platform with a receiving end and constructed to receive sliced bread in loaf form and guide the same for sidewise movement in said form and said machine including a power clutch, automatic clutch control means in the form of a presser bar mounted across said receiving end of the platform and operable by pressure of a loaf thereagainst to actuate said clutch, said conveyor having loaf conveying means operable to tilt a loaf advanced as aforesaid against the presser bar for movement onto said platform over said presser bar for subsequent movement onto the platform by a succeeding loaf.

2. In combination, a machine having a conveyor platform with a receiving end and a power clutch, and conveyor means movable circuitously around the platform from the underside around to the top side of said receiving end, so as to tilt an article, advanced by an external agency against said end, into a position for movement onto said platform by pushing effort of a succeeding article, together with automatic clutch control means in the form of means extending in the path of articles approaching the receiving end of the platform and yieldingly operable by pressure of an article thereagainst to actuate said clutch and operate said conveyor.

3. In a bread wrapping machine of a type adapted for cooperation with a bread slicing machine having a delivery platform upon which sliced bread is delivered sidewise in loaf form, automatic conveyor means including a conveyor platform having a receiving end and a discharge end, conveyor elements arranged in spaced relation and means for moving the same in a direction from beneath said platform around said receiving end thereof and toward said discharge end, driving means for moving the conveyor elements as aforesaid, clutch means operatively connecting said driving means with said conveyor means, and clutch control mechanism in the form of a presser member mounted across said receiving end of the platform and having operative connection with said clutch means, and spring means normally urging said presser in a direction away from said receiving end with said clutch in ineffective condition, said presser member being moved toward said receiving end to operate said clutch by a loaf of bread advanced sidewise from said delivery chute, said loaf being tilted by one of said conveyor elements moving from below said platform around said receiving end and said presser member so as to be in position for movement over said presser member onto said receiving end by succeeding loaves advanced from said delivery chute.

4. The automatic conveyor means of claim 3 further characterized by the provision of guide rail means adjustably mounted on said conveyor platform for cooperation with guide rail means on said delivery chute, whereby loaves of bread transferred as set forth from said delivery chute onto said platform will be maintained in loaf form during transit from the chute onto the platform.

5. The automatic conveyor means of claim 3 in which said receiving end of the conveyor platform is provided with bracket means supportably engaging said delivery chute in the region of the discharge end thereof at a level substantially below the top level of the receiving end of said platform.

ISRAEL C. GELLMAN.